Figure 1:
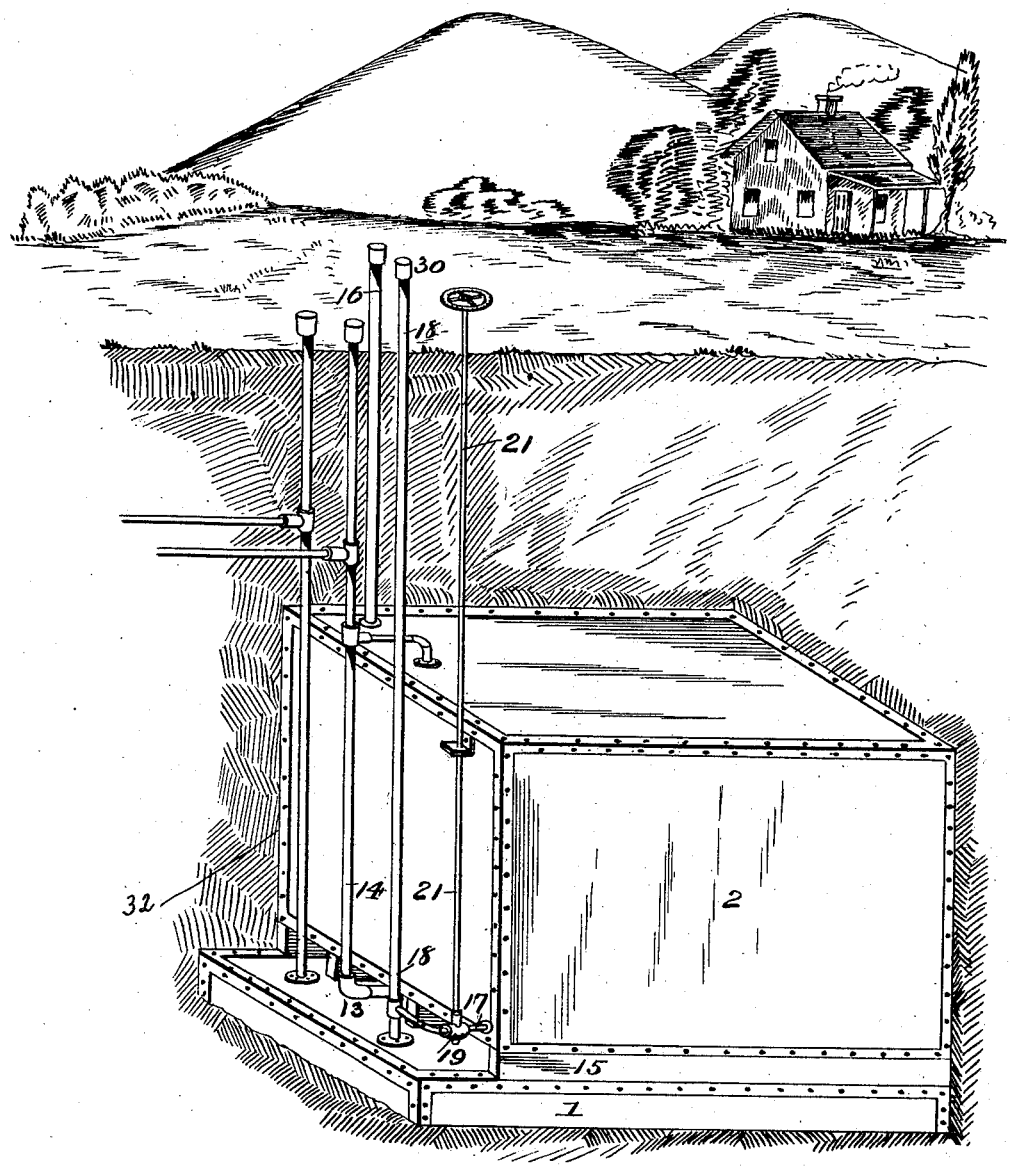

No. 707,467. Patented Aug. 19, 1902.
E. WALTHER.
CARBURETER.
(Application filed Apr. 24, 1902.)

(No Model.) 2 Sheets—Sheet 1.

Witnesses
F. L. Orrand,
Frank G. Radlfinger.

Edward Walther,
Inventor:
by Laus Bagger & Co.
Attorneys

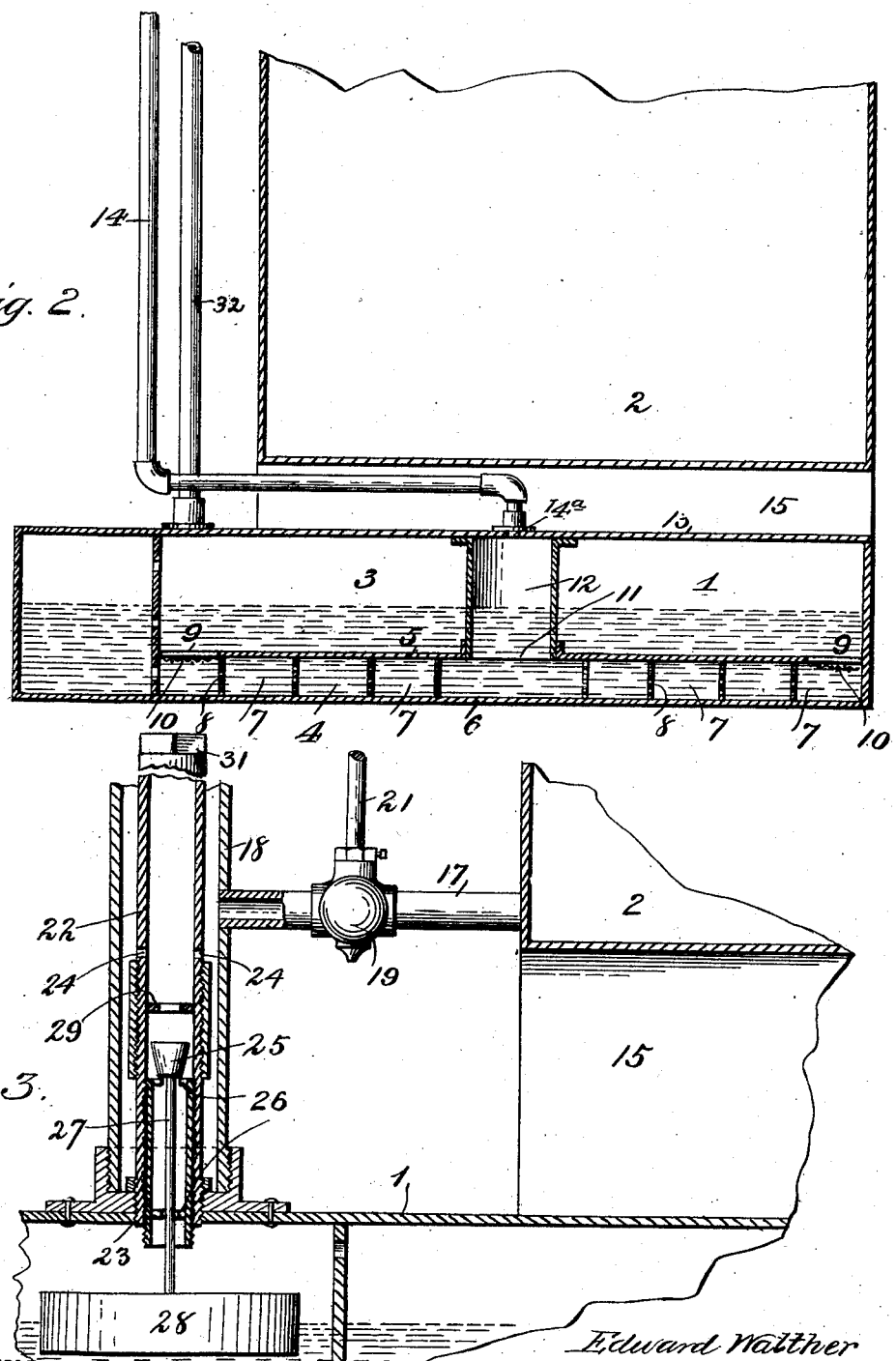

UNITED STATES PATENT OFFICE.

EDWARD WALTHER, OF WASHINGTON, IOWA.

CARBURETER.

SPECIFICATION forming part of Letters Patent No. 707,467, dated August 19, 1902.

Application filed April 24, 1902. Serial No. 104,450. (No model.)

*To all whom it may concern:*

Be it known that I, EDWARD WALTHER, a citizen of the United States, residing at Washington, in the county of Washington and State of Iowa, have invented new and useful Improvements in Carbureters, of which the following is a specification.

My invention relates to carbureters for a gasolene lighting or heating system; and the object of the same is to construct a device of this character which may be buried in the ground and be protected from fire and which will be provided with a simple and efficient gasolene-feed, with accessible means for operating it.

The simple and novel construction employed by me in carrying out my invention is fully described in this specification and claimed, and illustrated in the accompanying drawings, forming a part thereof, in which—

Figure 1 is a perspective of my supply-tank and generator. Fig. 2 is a vertical longitudinal section of the same. Fig. 3 is a detail of the check-valve, chamber, and float.

Like numerals of reference designate like parts in the different views of the drawings.

My curbureter comprises a generator 1 and a supply-tank 2, which are both located below the surface of the ground. The generator 1 is divided into two compartments 3 and 4 by a horizontal partition 5, extending parallel to the bottom 6 of the casing. The lower compartment 4 is divided into a number of smaller compartments 7 by vertical perforated partitions 8, which serve to break up the air-bubbles. Apertures 9 are formed in the ends of the partitions 5, and in these apertures are mounted screens 10. An aperture 11 is formed centrally the partition 5, and connected to the edges thereof is a cylinder 12, which extends up and is secured to the cover 13 of the generator. A pipe 14 for the admission of air to the generator 1 is connected to an aperture 14ª in the cover 13, communicating with the cylinder 12. The pipe 14 is connected to some source of air under pressure. (Not shown.) The supply-tank 2 is mounted on top of the generator 1 and is kept from direct contact therewith by sills 15. A pipe 16 is connected to the top of the tank 2 and extends above the ground to enable the tank 2 to be filled with gasolene. An outlet-pipe 17 for the gasolene is connected to the tank 2 at a point near the bottom and to a pipe 18, which is connected to the generator 1. A valve 19 is connected to the pipe 20 and is provided with a prolonged stem 21, extending above the surface of the ground. Inclosed in the pipe 18 is a pipe 22, which is concentric with the pipe 18 and snugly fits a threaded aperture 23 in the top of the generator 1. Perforations 24 in the pipe 22 permit the passage of gasolene from the pipe 18 into the pipe 22. A check-valve 25 is slidingly mounted in guides 26 in the pipe 22 and has a long stem 27, which extends down into the generator 1 and carries a float 28, designed to be operated by the gasolene in the generator to seat the valve 25 in a seat 29 to stop the flow of gasolene. The pipe 18 extends to a point above the surface of the ground and is provided with a cap 30. The pipe 22 extends up to the cap 30 and has its upper end 31 squared to enable a wrench to be applied thereto to unscrew it to remove it when the valve 25 is in need of repairs. An outlet-pipe 32 for the gas generated is connected to the generator 1 and forms a service-pipe for the gas.

In operation the tank 2 is filled with gasolene through the pipe 16, after which the valve 19 is opened to permit gasolene to flow into the generator 2 via the perforations 24 and pipe 22. When the gasolene in the generator 1 has reached the proper level, it will operate the valve 25 and cut off the flow of gasolene into the generator. The air is now turned on and will flow through the pipe 14 and into the cylinder 12, from whence it will pass down through the gasolene in the generator through the perforated partitions 8, and up through the screens 10, thereby vaporizing the gasolene. The gas thus generated will be drawn off through the pipe 32 as needed.

I do not wish to be limited as to details of construction, as these may be modified in many particulars without departing from the spirit of my invention.

Having thus described my invention, what I claim as new, and wish to secure by Letters Patent, is—

1. In a carbureter, the combination with a vapor-generator located below the surface of the ground, of a perforated pipe screwed into a threaded aperture in said generator and extending up to the surface of the ground, an oil-shut-off valve mounted in said pipe and carrying a float located in said generator, a pipe surrounding said first-mentioned pipe and extending to the surface of the ground and supplied with a detachable cap, and gasolene connections for said last-mentioned pipe, substantially as described.

2. In a carbureter, the combination with a vapor-generator and a gasolene-supply tank both located below the surface of the ground, of a pipe connected to said generator and extending above the ground, said pipe having a detachable cap thereon, a pipe connecting said gasolene-supply tank and said pipe, a perforated pipe inclosed in said first-mentioned pipe and containing a valve arranged to be operated by the gasolene in said generator to regulate the flow of gasolene from said supply-tank to said generator, said last-mentioned pipe being mounted to be removed to obtain access to said valve, substantially as described.

In testimony whereof I have hereunto set my hand in presence of two subscribing witnesses.

EDWARD WALTHER.

Witnesses:
J. W. MORTON,
GEORGE S. TRIPP.